(12) United States Patent
Strecker et al.

(10) Patent No.: US 11,548,550 B2
(45) Date of Patent: Jan. 10, 2023

(54) ADAPTATION OF THE STEERING FEEL IN STEER-BY-WIRE STEERING SYSTEMS

(71) Applicant: Robert Bosch GmbH, Stuttgart (DE)

(72) Inventors: Joerg Strecker, Pluederhausen (DE); Alexander Sauter, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 16/768,955

(22) PCT Filed: Dec. 12, 2018

(86) PCT No.: PCT/EP2018/084427
§ 371 (c)(1),
(2) Date: Jun. 2, 2020

(87) PCT Pub. No.: WO2019/115563
PCT Pub. Date: Jun. 20, 2019

(65) Prior Publication Data
US 2021/0214002 A1     Jul. 15, 2021

(30) Foreign Application Priority Data

Dec. 15, 2017   (DE) ................. 10 2017 222 952.7

(51) Int. Cl.
*B62D 5/04*       (2006.01)
*B62D 6/00*       (2006.01)
*B62D 5/00*       (2006.01)
*B60W 10/20*      (2006.01)
*B60W 30/02*      (2012.01)

(52) U.S. Cl.
CPC ............ *B62D 6/008* (2013.01); *B62D 5/006* (2013.01)

(58) Field of Classification Search
None
See application file for complete search history.

(56) References Cited

U.S. PATENT DOCUMENTS

2004/0039507 A1* 2/2004 Yao .................. B62D 6/008
                                                                701/41
2005/0067214 A1  3/2005 Tanaka et al.

FOREIGN PATENT DOCUMENTS

DE    10 2007 040 064 A1    2/2009
DE    10 2009 000 638 A1    8/2010
DE       102009000638 A1 *  8/2010  ............ B62D 6/008
DE       102014 117718 A1   6/2016
DE    10 2015 216 040 A1    2/2017

(Continued)

OTHER PUBLICATIONS

International Search Report corresponding to PCT Application No. PCT/EP2018/084427, dated Apr. 2, 2019 (German and English language document) (6 pages).

*Primary Examiner* — Angela Y Ortiz
*Assistant Examiner* — Laura E Linhardt
(74) *Attorney, Agent, or Firm* — Maginot, Moore & Beck LLP

(57) ABSTRACT

A method for adapting the steering feel for a driver of a vehicle at an input element of the vehicle is described. The vehicle has a steer-by-wire steering system. The method comprises creating a reference of the steering feel. The method further comprises selecting scaling factors for the reference model such that characteristics of the steering feel remain constant for different steering ratios. The method further comprises adapting the steering feel using the scaling factors.

13 Claims, 2 Drawing Sheets

(56) References Cited

FOREIGN PATENT DOCUMENTS

| | | |
|---|---|---|
| JP | 2002-37111 A | 2/2002 |
| JP | 2005-41416 A | 2/2005 |
| JP | 2008-296605 A | 12/2008 |
| JP | 2012-516805 A | 7/2012 |
| JP | 2013-23145 A | 2/2013 |
| JP | 2017-149358 A | 8/2017 |
| WO | 2011/002348 A1 | 1/2011 |
| WO | 2017/135884 A1 | 8/2017 |

* cited by examiner

ADAPTATION OF THE STEERING FEEL IN STEER-BY-WIRE STEERING SYSTEMS

This application is a 35 U.S.C. § 371 National Stage Application of PCT/EP2018/084427, filed on Dec. 12, 2018, which claims the benefit of priority to Serial No. DE 10 2017 222 952.7, filed on Dec. 15, 2017 in Germany, the disclosures of which are incorporated herein by reference in their entirety.

BACKGROUND

The present disclosure relates to a method for adapting the steering feel with the aid of an input element, for example, a steering wheel, for a driver of a vehicle, wherein the steering system is a steer-by-wire steering system.

Steering feel, in this case, is the combination of driving experience, that is, the steering torque at the steering wheel, the steering ratio, i.e., the ratio between the steering wheel and the steering angle, and the vehicle response, which reflects the feedback of the steering input via the vehicle to the driver.

Steering systems including a mechanical connection of the steering wheel to the steering angle are known in the related art. It is also known that steer-by-wire steering systems are possible, wherein there is no mechanical connection between the steering wheel and wheels to be steered.

SUMMARY

Present EPS steering systems encompass a continuous mechanical coupling from the steering wheel of the relevant vehicle up to the steering angle. There is a mechanical push-through, which results in a ratio from the wheel up to the steering wheel, which is constant or not changeable with the aid of software. Therefore, an adaptation of the steering ratio, e.g., for a specific range, cannot be carried out. In contrast, there is no mechanical push-through in steer-by-wire steerings. Steer-by-wire steering systems are distinguished by the fact that there is no mechanical connection between the steering wheel and the steering angle of the steerable wheels. As a result, it is possible to move the steering wheel independently of the deflection or to change the ratio of the steerable wheel with respect to the input element depending on the range.

One object, therefore, is to provide a steering system for a steer-by-wire steering, wherein the steering feel of the driver at the steering wheel is adapted in order to impart an adequate or pleasant steering feel via the steering wheel.

As a first specific embodiment of the disclosure, a method is provided for adapting the steering feel for a driver of a vehicle at an input element of the vehicle, wherein the vehicle encompasses a steer-by-wire steering system, including the steps: creating a reference of the steering feel and adapting the steering feel with the aid of scaling factors.

Steer-by-wire steering systems offer the possibility to arbitrarily adjust the steering feel due to the steering wheel as a result of the decoupling of the input element, in particular the steering wheel, and the steering angle. In particular, the steering feel can be adjusted in such a way that a high level of comfort and a high level of reliability results for the driver of the relevant vehicle.

As a second specific embodiment of the disclosure, a control unit of a steering system is provided, which includes a processing unit for carrying out a method.

As a third specific embodiment of the disclosure, a steering system is provided, which includes a control unit.

Exemplary specific embodiments are described herein.

According to one exemplary specific embodiment of the disclosure, a method is provided, wherein the reference includes the elements: Basic steering torque having the input variables toothed bar force and vehicle speed and/or active return having the input variables steering wheel angle, driver torque, and vehicle speed and/or damping having the input variables steering wheel angular velocity, driver torque, and vehicle speed and/or hysteresis having the input variables steering wheel angular velocity, driver torque, and vehicle speed and/or inertia having the input variables steering wheel angular acceleration, driver torque, and vehicle speed.

The elements basic steering torque, active return, damping, hysteresis, and inertia are significant elements for creating a reference of a steering feel. There can be further elements, however, which can also be taken into account in the calculation of the reference.

According to one further exemplary embodiment of the present disclosure, a method is provided, wherein the scaling factors result as reference basic steering torque/instantaneous basic steering torque and/or reference active return/instantaneous active return and/or reference damping/instantaneous damping and/or reference hysteresis/instantaneous hysteresis and/or reference inertia/instantaneous inertia.

According to yet one further specific embodiment of the disclosure, a method is provided, wherein a setpoint steering feel results as:

Setpoint steering feel=basic steering torque·scaling factor_1+active return·scaling factor_2+ damping·scaling factor_3+hysteresis scaling factor_4+inertia·scaling factor_5.

In one further specific embodiment according to the disclosure, a method is provided, wherein the following results: Scaling factor_1=reference basic steering torque/ instantaneous basic steering torque and/or scaling factor_2=reference active return/instantaneous active return and/or scaling factor_3=reference damping/instantaneous damping and/or scaling factor_4=reference hysteresis/instantaneous hysteresis and/or scaling factor_5=reference inertia/instantaneous inertia.

According to one further exemplary specific embodiment of the disclosure, a method is provided, wherein the input element is a steering wheel.

In one alternative specific embodiment, an input element is a joystick.

In one further specific embodiment according to the disclosure, a steering system is provided, wherein the steering system is a central controller or a single-wheel controller. A corner module, for example, can be considered as a single-wheel controller, in the case of which steering, brake application, and drive are integrated in one unit per wheel. Central controllers can differ, with respect to their configuration, from the single-wheel controller by the axially displaceable movement element, classically designed as a toothed bar.

According to yet one further specific embodiment of the disclosure, a steering system is provided, wherein the steering system is a central controller or a single-wheel controller.

As an idea of the disclosure, it can be considered to utilize the mechanical decoupling of the steering wheel from the steering angle of a vehicle in order to achieve an improved steering feel, in particular in order to allow for a steering motion of a steering wheel, which represents, for the relevant driver, a pleasant steering feel and an appropriate aid during the steering of the vehicle.

As a further idea of the disclosure, it can be considered to adapt the scaling of the steering feel, which results for the driver of a vehicle, in such a way that the steering feel also remains constant or its characteristics also remain constant in the case of different steering ratios.

In particular, the decoupling of the input element of the vehicle, in particular of the steering wheel, and of the steering angle in a steer-by-wire steering system of a central controller or a single-wheel controller is to be utilized in order to provide a scalability of the steering feel in the case of a change of the variable ratio of the steering system.

As a result, a reduction of the application effort advantageously results, since a limited number of application variants can be accessed. In addition, the utilization of a reference application is made possible, wherein the reference application is to be understood as a desired target application. Additionally or alternatively, one or multiple parameters can be introduced, which allow for an adaptation and scaling of the angle-dependent steering feel components via a ratio formation. As a result, an additional control option of the input element, in particular of the steering wheel, results.

The individual features can also be combined with one another, of course, whereby advantageous effects can also set in, in part, which go beyond the sum of the individual effects.

BRIEF DESCRIPTION OF THE DRAWINGS

Further details and advantages of the disclosure become clear on the basis of the exemplary embodiments represented in the drawings. In the drawings

DETAILED DESCRIPTION

Figure 1:
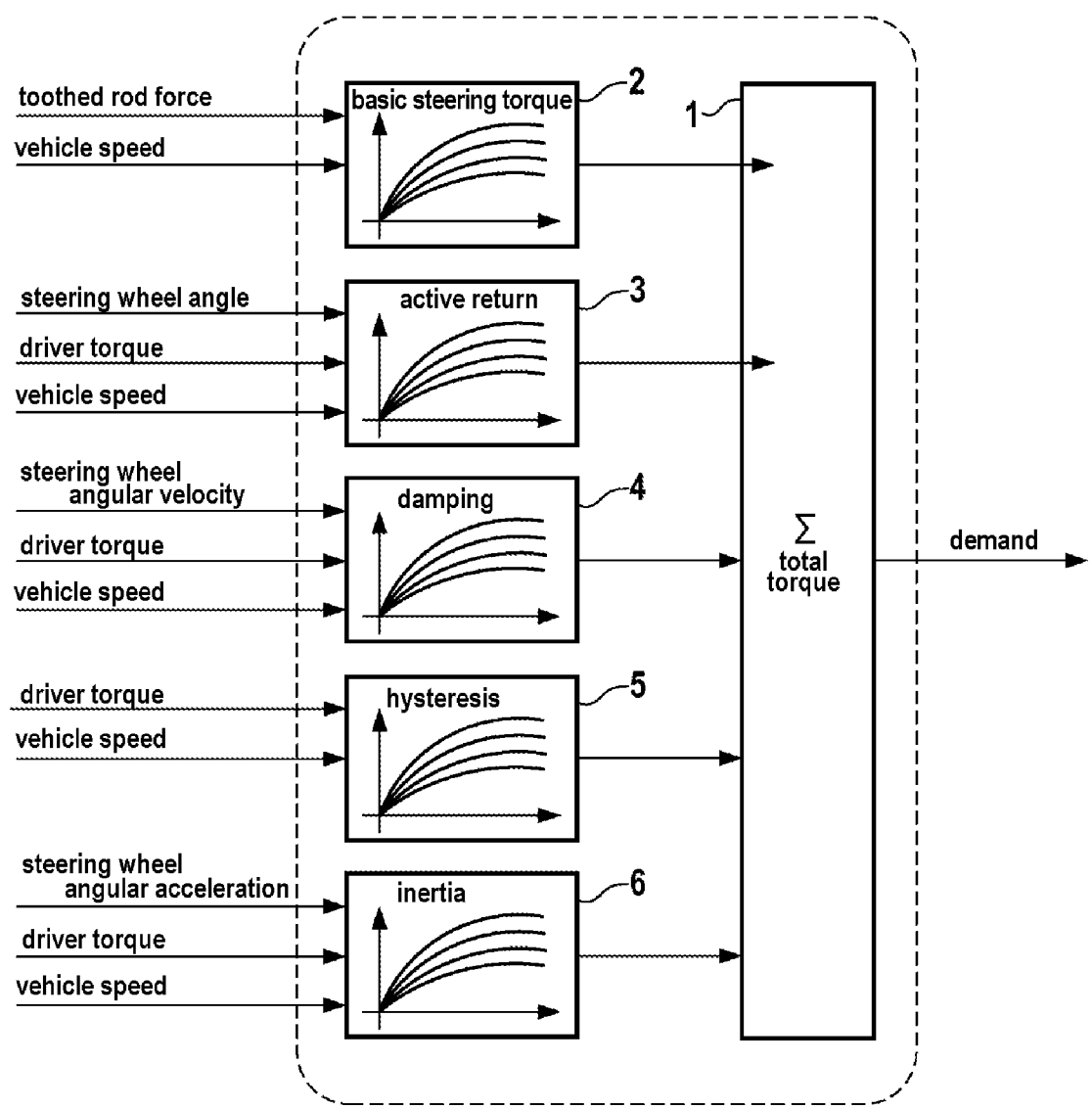
FIG. 1 shows a representation of the elements of a steering feel application device.

FIG. 1 shows a device for forming a steering feel for the driver of the relevant vehicle, wherein the device can be made up of different components. For example, including a first component 2, which provides a basic steering torque, a component 3, which applies an active return torque, whereby a desired setpoint return behavior of the steering wheel to the center results over the entire vehicle speed range. In addition, one component 4 can generate a damping, one further component 5 yields a hysteresis behavior, and one component 6 results in an inertia.

Input variables of the component basic steering torque 2 can be a toothed rod force and the vehicle speed. Input variables of the active return 3 can be the steering wheel angle, the driving torque, and the vehicle speed. With respect to the input variable of the instantaneous steering wheel angle, an appropriate setpoint return speed is predefined. This property determines the vehicle response and the return of the vehicle axle to the center. Therefore, in the case of ratios that are more direct than the reference ratio, there is a smaller steering wheel angle given the same wheel position and the return to the center must take place correspondingly more slowly. In the case of indirect ratios, the behavior is the other way around, so that the setpoint return speed must be increased in order to achieve a similar behavior as in the reference application of the steering feel. Input variables of the damping 4 can be the steering wheel angular velocity, the driving torque, and the vehicle speed. Input variables in the calculation of the hysteresis 5 can be the steering wheel angular velocity, the driving torque, and the vehicle speed. Input variables of the component 6 can be the steering wheel acceleration, the driving torque, and the vehicle speed.

A particular scaling factor can be calculated for the steering wheel angle variables for all elements, which results from the ratio of the reference ratio with respect to the instantaneous ratio.

The corresponding formula for the scaling factor results as: Scaling factor steering feel application=(starting ratio reference application)/(instantaneous ratio).

The scaling factor necessary for all modules therefore results as a ratio of the reference ratio with respect to the instantaneous ratio. The instantaneous ratio depends on the different circumstances, such as toothed bar stroke and/or speed of the relevant vehicle. The scaling factor as the result of the ratio formation affects the angle, the angular velocity, and/or the angular acceleration of the steering wheel. The scaling factor can be additionally adapted, for example, to the driving situation or to the driving style of the driver.

Figure 2:
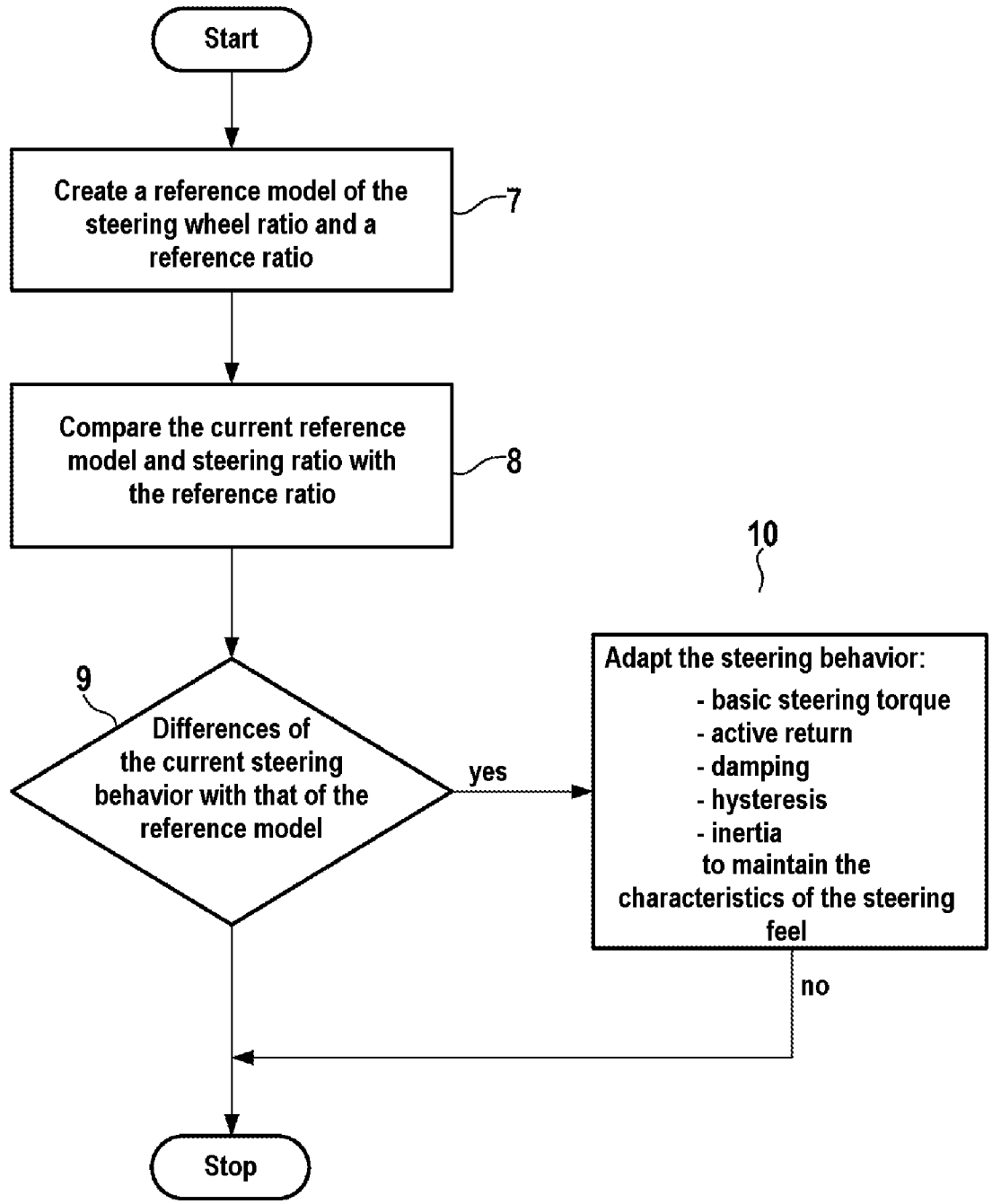
FIG. 2 shows a flow chart of a sequence of a steering feel application according to the disclosure.

FIG. 2 shows a flow chart for the application of a steering feel onto a steering wheel, wherein, in a first step, a reference model is created 7 as a setpoint value of a desired steering feel. This reference model can comprise five units and, in fact, a basic steering torque, an active return, a damping, a hysteresis, and an inertia 8. If it results that the present steering feel, which a driver of the relevant vehicle perceives at the steering wheel, deviates 9 from this desired steering feel, an appropriate adaptation 10 of the steering behavior takes place, in particular of the basic steering torque, the active return, the damping, the hysteresis and/or the inertia, in order to maintain the characteristics of the steering feel.

It is to be noted that the term "includes" does not rule out further elements or method steps, just as the term "a" and "one" does not rule out multiple elements and steps.

The utilized reference numerals are intended merely to enhance the clarity and are not to be considered, in any way, as limiting, wherein the scope of protection of the disclosure is presented by the claims.

The invention claimed is:

1. A method for adapting a steering feel for a driver of a vehicle at an input element of the vehicle, the vehicle including a steer-by-wire steering system, the method comprising:
creating a reference model of the steering feel, the reference model including a plurality of torque components;
selecting a plurality of scaling factors, each respective scaling factor in the plurality of scaling factors corresponding to a respective torque component of the plurality of torque components, each respective scaling factor in the plurality of scaling factors being determined based on a reference value and an instantaneous value for the associated respective torque component, such that characteristics of the steering feel remain constant for different steering ratios; and
adapting the steering feel using the reference model of the steering feel and the scaling factors.

2. The method as claimed in claim 1, the creating the reference further comprising:
creating the reference model with the plurality of components including a basic steering torque component having as input variables toothed bar force and vehicle speed.

3. The method as claimed in claim 1, the selecting the plurality of scaling factors further comprising:
selecting each scaling factor of the plurality of scaling factors based on a ratio of a reference ratio and an instantaneous ratio.

4. The method as claimed in claim 1, the adapting the steering feel further comprising:
   determining a setpoint steering feel as equal to a sum of products, each product being a product of a respective scaling factor of the plurality of scaling factors with the associated respective torque component of the plurality of torque components.

5. The method as claimed in claim 1, the selecting the plurality of scaling factors further comprising:
   determining each scaling factor of the plurality of scaling factors as equal to a ratio of the reference value and the instantaneous value for the associated respective torque component.

6. The method as claimed in claim 1, wherein the input element is a steering wheel.

7. A controller for adapting a steering feel for a driver of a vehicle at an input element of the vehicle, the controller being part of a steering system of the vehicle, the controller comprising:
   a processor configured to:
      create a reference model of the steering feel, the reference model including a plurality of torque components;
      select a plurality of scaling factors, each respective scaling factor in the plurality of scaling factors corresponding to a respective torque component of the plurality of torque components, each respective scaling factor in the plurality of scaling factors being determined based on a reference value and an instantaneous value for the associated respective torque component, such that characteristics of the steering feel remain constant for different steering ratios; and
      adapt the steering feel using the reference model of the steering feel and the scaling factors.

8. A steering system for a vehicle, the steering system comprising:
   a controller configured to adapt a steering feel for a driver of the vehicle at an input element of the vehicle, the controller having a processor configured to:
      create a reference model of the steering feel, the reference model including a plurality of torque components;
      select a plurality of scaling factors, each respective scaling factor in the plurality of scaling factors corresponding to a respective torque component of the plurality of torque components, each respective scaling factor in the plurality of scaling factors being determined based on a reference value and an instantaneous value for the associated respective torque component, such that characteristics of the steering feel remain constant for different steering ratios; and
      adapt the steering feel using the reference model of the steering feel and the scaling factors.

9. The steering system as claimed in claim 8, wherein the steering system includes one of (i) a central controller and (ii) a single-wheel controller.

10. The method as claimed in claim 1, the creating the reference further comprising:
    creating the reference model with components including an active return component having as input variables steering wheel angle, driver torque, and vehicle speed.

11. The method as claimed in claim 1, the creating the reference further comprising:
    creating the reference model with components including a damping component having as input variables steering wheel angular velocity, driver torque, and vehicle speed.

12. The method as claimed in claim 1, the creating the reference further comprising:
    creating the reference model with components including a hysteresis component having as input variables steering wheel angular velocity, driver torque, and vehicle speed.

13. The method as claimed in claim 1, the creating the reference further comprising: creating the reference model with components including an inertia component having as input variables steering wheel angular acceleration, driver torque, and vehicle speed.

* * * * *